United States Patent
Shiau

(10) Patent No.: US 12,094,237 B1
(45) Date of Patent: Sep. 17, 2024

(54) DASHBOARD DEVICE, MOBILE CARRIER AND AUTHENTICATION METHOD FOR MOBILE CARRIER

(71) Applicant: Wistron Corporation, New Taipei (TW)

(72) Inventor: Yi-Hau Shiau, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 18/300,359

(22) Filed: Apr. 13, 2023

(30) Foreign Application Priority Data

Mar. 14, 2023 (TW) .................. 112109405

(51) Int. Cl.
| | | |
|---|---|---|
| *G06V 40/13* | (2022.01) | |
| *B60K 35/00* | (2006.01) | |
| *G06V 40/12* | (2022.01) | |
| *B60K 35/10* | (2024.01) | |
| *B60K 35/22* | (2024.01) | |

(52) U.S. Cl.
CPC .......... *G06V 40/1306* (2022.01); *B60K 35/00* (2013.01); *G06V 40/1329* (2022.01); *G06V 40/1365* (2022.01); *B60K 35/10* (2024.01); *B60K 35/223* (2024.01); *B60K 2360/1438* (2024.01); *B60K 2360/47* (2024.01); *B60K 2360/48* (2024.01)

(58) Field of Classification Search
CPC .......... G06V 40/1306; G06V 40/1329; G06V 40/1365; B60K 35/00; B60K 35/10; B60K 35/223; B60K 2360/1438; B60K 2360/47; B60K 2360/48
See application file for complete search history.

(56) References Cited

U.S. PATENT DOCUMENTS

| | | | |
|---|---|---|---|
| 11,417,139 B2 | 8/2022 | Lin et al. | |
| 2015/0324570 A1* | 11/2015 | Lee .................. | G06V 10/242 382/124 |
| 2019/0248439 A1* | 8/2019 | Wang .................. | B62K 11/10 |
| 2019/0251403 A1* | 8/2019 | Raynor ................ | G06V 20/64 |
| 2020/0160018 A1* | 5/2020 | Panchawagh ........ | H10N 30/857 |
| 2020/0380240 A1* | 12/2020 | Liu .................... | G06V 40/1324 |
| 2021/0004117 A1* | 1/2021 | Kim .................... | G06F 1/1637 |
| 2021/0295004 A1* | 9/2021 | Liu .................... | G06V 40/1318 |
| 2022/0198171 A1 | 6/2022 | Lin et al. | |
| 2023/0086442 A1* | 3/2023 | Van Ostrand ....... | G06F 3/04166 345/173 |

FOREIGN PATENT DOCUMENTS

| | | |
|---|---|---|
| CN | 206493922 | 9/2017 |
| CN | 110245636 | 9/2019 |
| TW | 201629841 | 8/2016 |
| TW | I760035 | 4/2022 |

* cited by examiner

*Primary Examiner* — Ibrahim A Khan

(74) *Attorney, Agent, or Firm* — JCIPRNET

(57) ABSTRACT

A dashboard device including a device body, a functional interface layer, and an ultrasonic fingerprint identification assembly is disclosed. The functional interface layer is disposed on the device body. The ultrasonic fingerprint identification assembly is disposed on the device body and covered by the functional interface layer. In addition, a mobile carrier and an authentication method for the mobile carrier are also disclosed.

18 Claims, 10 Drawing Sheets

DASHBOARD DEVICE, MOBILE CARRIER AND AUTHENTICATION METHOD FOR MOBILE CARRIER

CROSS-REFERENCE TO RELATED APPLICATION

This application claims the priority benefit of Taiwan application serial no. 112109405, filed on Mar. 14, 2023. The entirety of the above-mentioned patent application is hereby incorporated by reference herein and made a part of this specification.

BACKGROUND

Technical Field

The disclosure relates to a dashboard device, a mobile carrier, and an authentication method for the mobile carrier.

Description of Related Art

Generally speaking, a mobile carrier such as cars or motorcycles may only be operated and driven by a corresponding key or remote control. If the key or remote control is lost or forgotten to carry, the mobile carrier may not be operated and driven. In addition, the mobile carrier may not identify an identity of a user through the key or remote control. As a result, it is difficult for the mobile carrier to perform corresponding function setting and management for different users.

SUMMARY

The disclosure provides a dashboard device, a mobile carrier, and an authentication method for the mobile carrier, which may identify an identity of a user through a fingerprint.

A dashboard device in the disclosure includes a device body, a functional interface layer, and an ultrasonic fingerprint identification assembly. The functional interface layer is disposed on the device body. The ultrasonic fingerprint identification assembly is disposed on the device body and covered by the functional interface layer.

A mobile carrier in the disclosure includes a carrier body and a dashboard device. The dashboard device includes a device body, a functional interface layer, and an ultrasonic fingerprint identification assembly. The device body is disposed on the carrier body. The functional interface layer is disposed on the device body. The ultrasonic fingerprint identification assembly is disposed on the device body and covered by the functional interface layer.

In an embodiment of the disclosure, the functional interface layer includes a display panel, and the display panel covers the ultrasonic fingerprint identification assembly.

In an embodiment of the disclosure, the functional interface layer includes at least one solar element, and the at least one solar element covers the ultrasonic fingerprint identification assembly.

In an embodiment of the disclosure, the functional interface layer includes a shield layer, and the shield layer covers the ultrasonic fingerprint identification assembly.

In an embodiment of the disclosure, the shield layer has multiple air bubbles, and each of the air bubbles has a size of less than 5 microns.

In an embodiment of the disclosure, the dashboard device includes a double-sided adhesive. The ultrasonic fingerprint identification assembly is glued to the functional interface layer through the double-sided adhesive.

In an embodiment of the disclosure, the dashboard device includes a cushion material. The ultrasonic fingerprint identification assembly is located between the functional interface layer and the cushion material, and a gap is between the ultrasonic fingerprint identification assembly and the cushion material.

In an embodiment of the disclosure, the gap is greater than 0.15 mm.

In an embodiment of the disclosure, the dashboard device includes a light-transmitting protection plate. The light-transmitting protection plate covers the functional interface layer.

In an embodiment of the disclosure, a light transmittance of the light-transmitting protection plate is greater than 94%.

In an embodiment of the disclosure, a driving voltage of the ultrasonic fingerprint identification assembly is greater than 1000 millivolts.

In an embodiment of the disclosure, the ultrasonic fingerprint identification assembly includes a fingerprint sensor, a controller, a connector, and two flexible printed circuits. One of the two flexible printed circuits is connected between the fingerprint sensor and the controller, and the other of the two flexible printed circuits is connected between the connector and the controller.

An authentication method for a mobile carrier in the disclosure includes the following. A fingerprint database is established. The fingerprint database includes at least one fingerprint data. A fingerprint identification assembly of the mobile carrier is used to identify a fingerprint of a user to obtain an identification result. It is determined whether the fingerprint of the user matches the at least one fingerprint data according to the identification result. If the fingerprint of the user matches the at least one fingerprint data, a predetermined procedure corresponding to the at least one fingerprint data is executed

DETAILED DESCRIPTION OF DISCLOSED EMBODIMENTS

Figure 1:
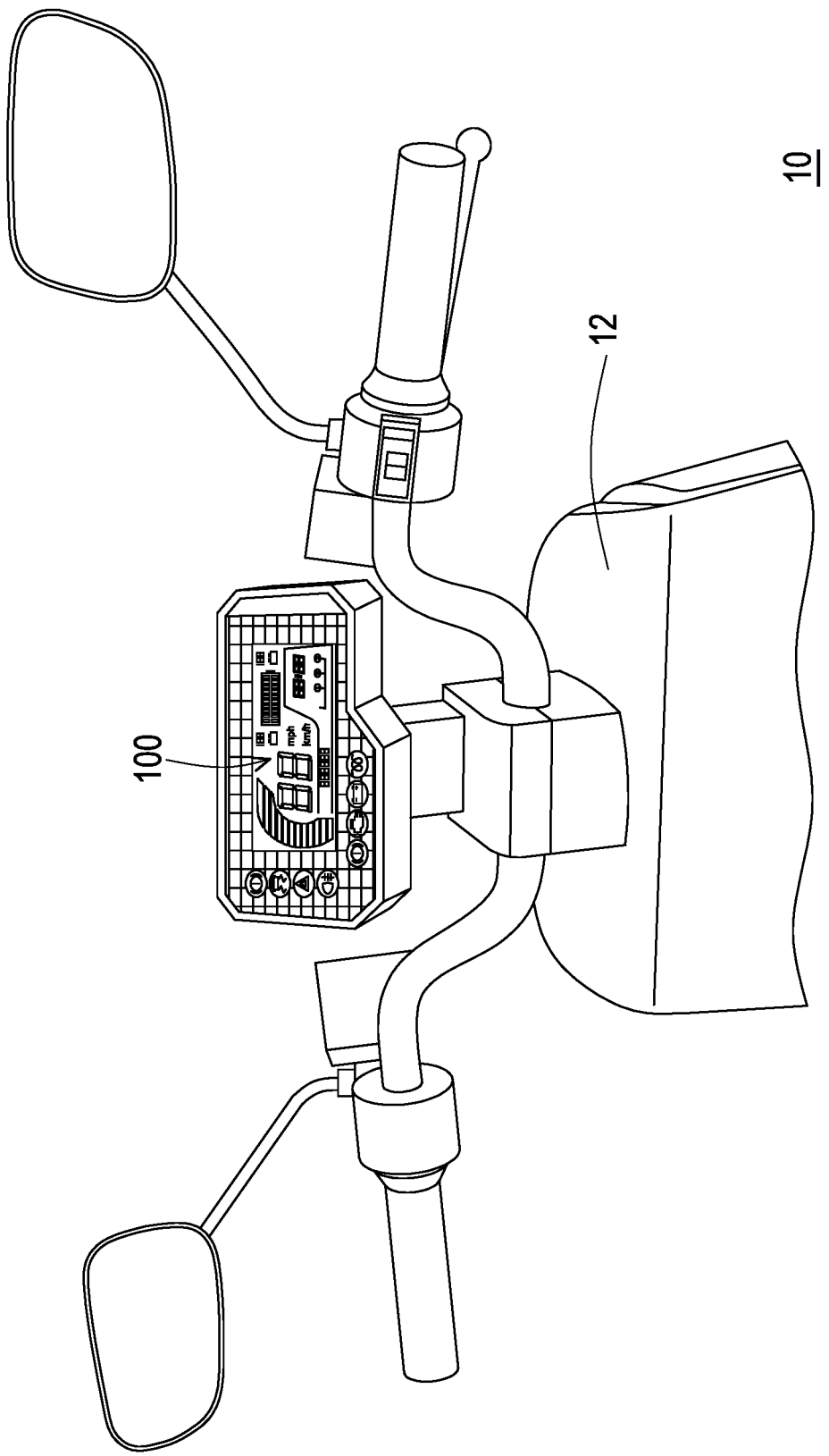
FIG. 1 is a schematic view of a mobile carrier according to an embodiment of the disclosure.
Figure 2:
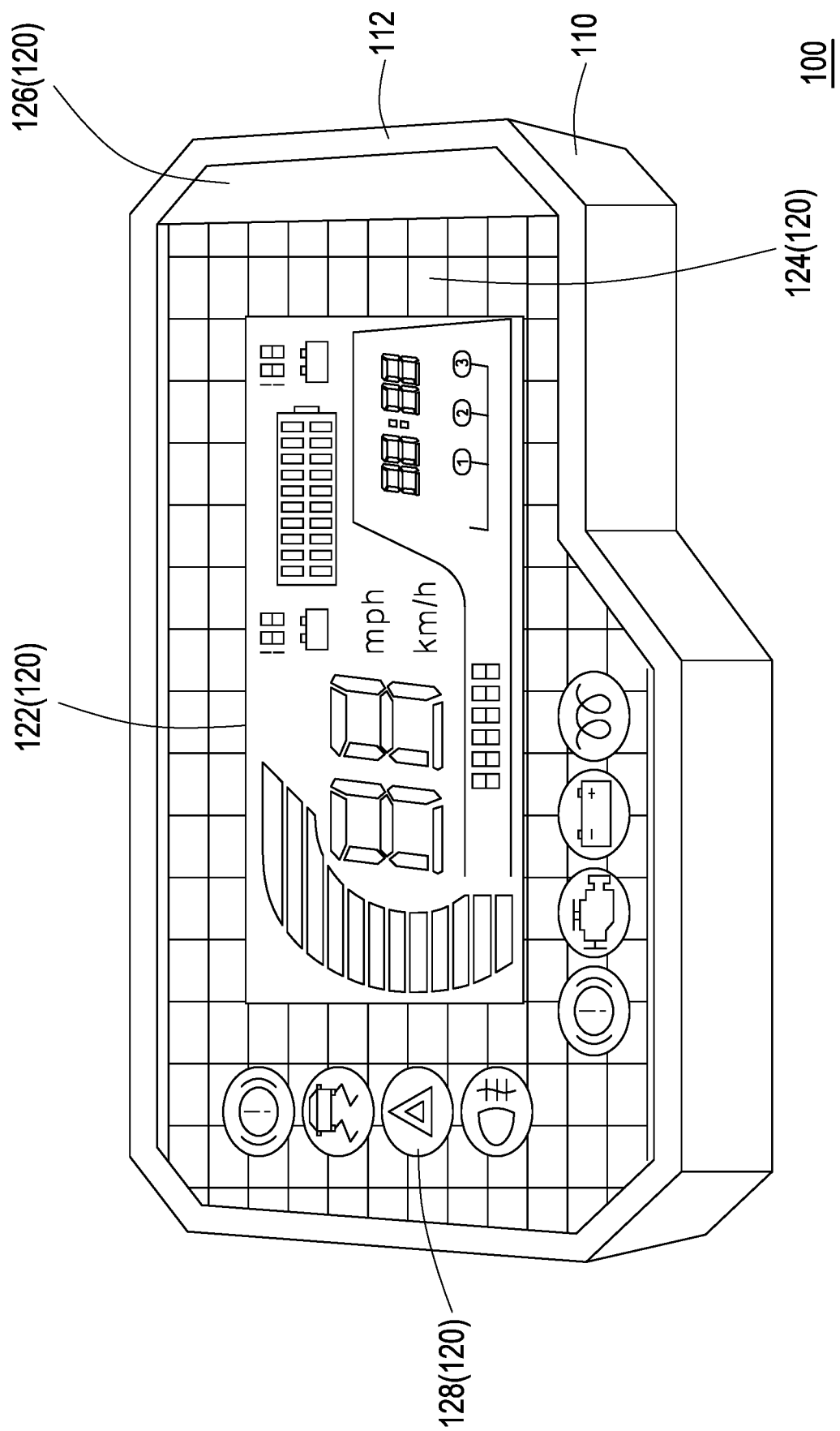
FIG. 2 shows a dashboard device in FIG. 1.

FIG. 1 is a schematic view of a mobile carrier according to an embodiment of the disclosure. FIG. 2 shows a dashboard device in FIG. 1. Referring to FIGS. 1 and 2, a mobile carrier 10 in this embodiment is, for example, a motorcycle or other types of motor vehicles, which includes a carrier body 12 and a dashboard device 100. The dashboard device 100 includes a device body 110 and a functional interface layer 120. The device body 110 is disposed on the carrier body 12, and the functional interface layer 120 is disposed on the device body 110 and surrounded by a frame portion 112 of the device body 110.

Figure 3:
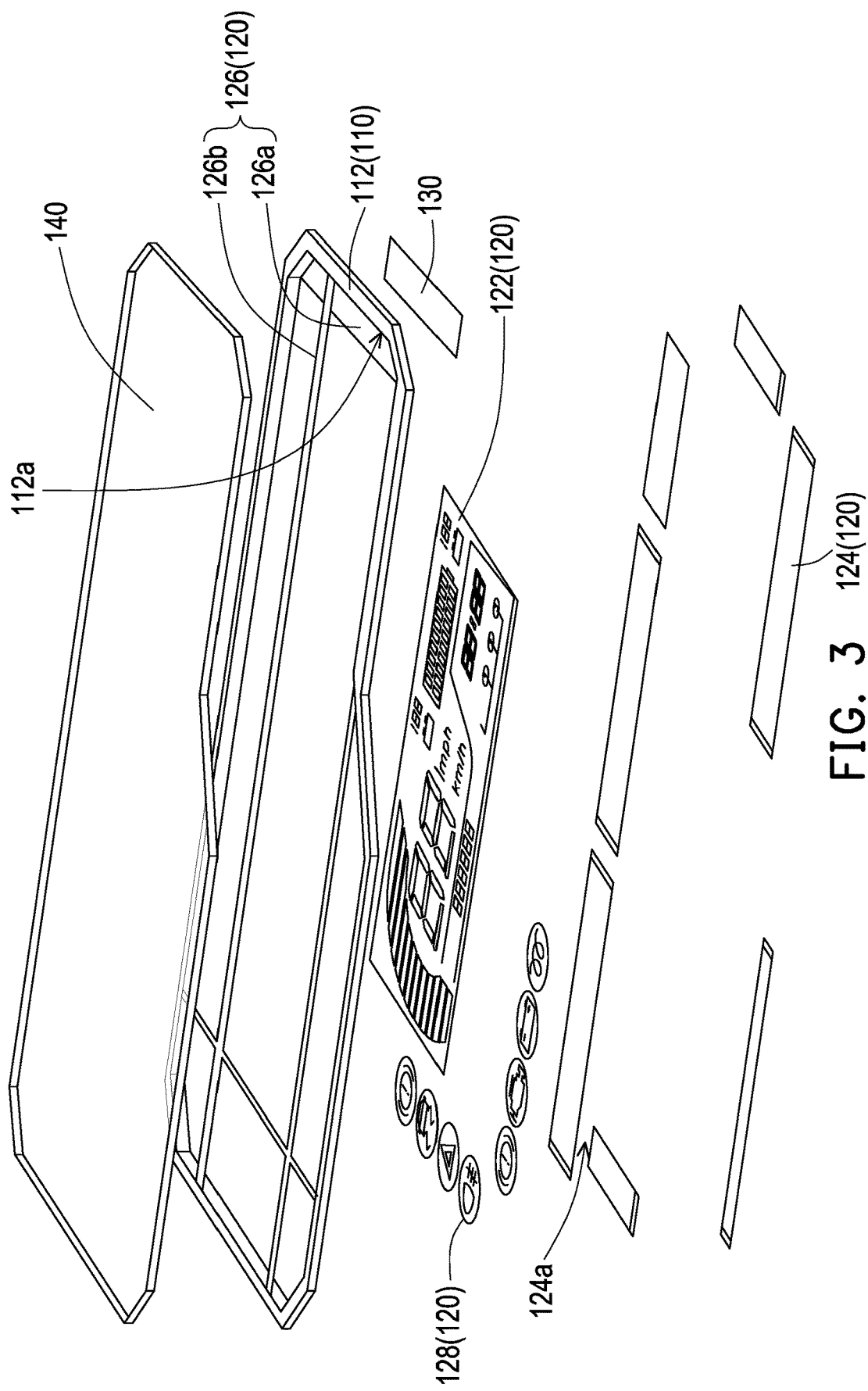
FIG. 3 is an exploded view of the dashboard device in FIG. 2.

FIG. 3 is an exploded view of the dashboard device in FIG. 2. In order for the drawing to be clearer, only the frame portion 112 of the device body 110 in FIG. 3 is shown. In order for the drawing to be clearer, a light-transmitting protection plate 140 in FIG. 3 is not shown in FIG. 2. Referring to FIGS. 2 and 3, the functional interface layer 120 in this embodiment includes a display panel 122, multiple solar elements 124, a shield layer 126, and multiple state indicating light emitting elements 128. The display panel 122 is configured to display information such as a vehicle speed and power of the mobile carrier 10 for a user to watch. The solar element 124 surrounds the display panel 122 and is configured to convert ambient light into electricity for use by the mobile carrier 10. The shield layer 126 is, for example, a black printing layer and includes shield portions 126a and 126b. The shield portion 126a is, for example, a black frame and shields an inner edge 112a of the frame portion 112. The shield portion 126b is, for example, a black line and shields at a junction 124a of the adjacent solar elements 124 (that is, a splicing line of the adjacent solar elements 124), so that the functional interface layer 120 has a good appearance. The number and distribution of the solar elements 124 are only schematically shown in FIG. 3. In fact, more solar elements 124 with a larger number and larger distribution area may be disposed. Each of the state indicating light emitting elements 128 is configured to emit light to indicate a state of the mobile carrier 10. Electrical connections and detailed functions of the display panel 122, the solar element 124, and the state indicating light emitting element 128 are known in the art. Therefore, the same details will not be repeated in the following.

Figure 4:
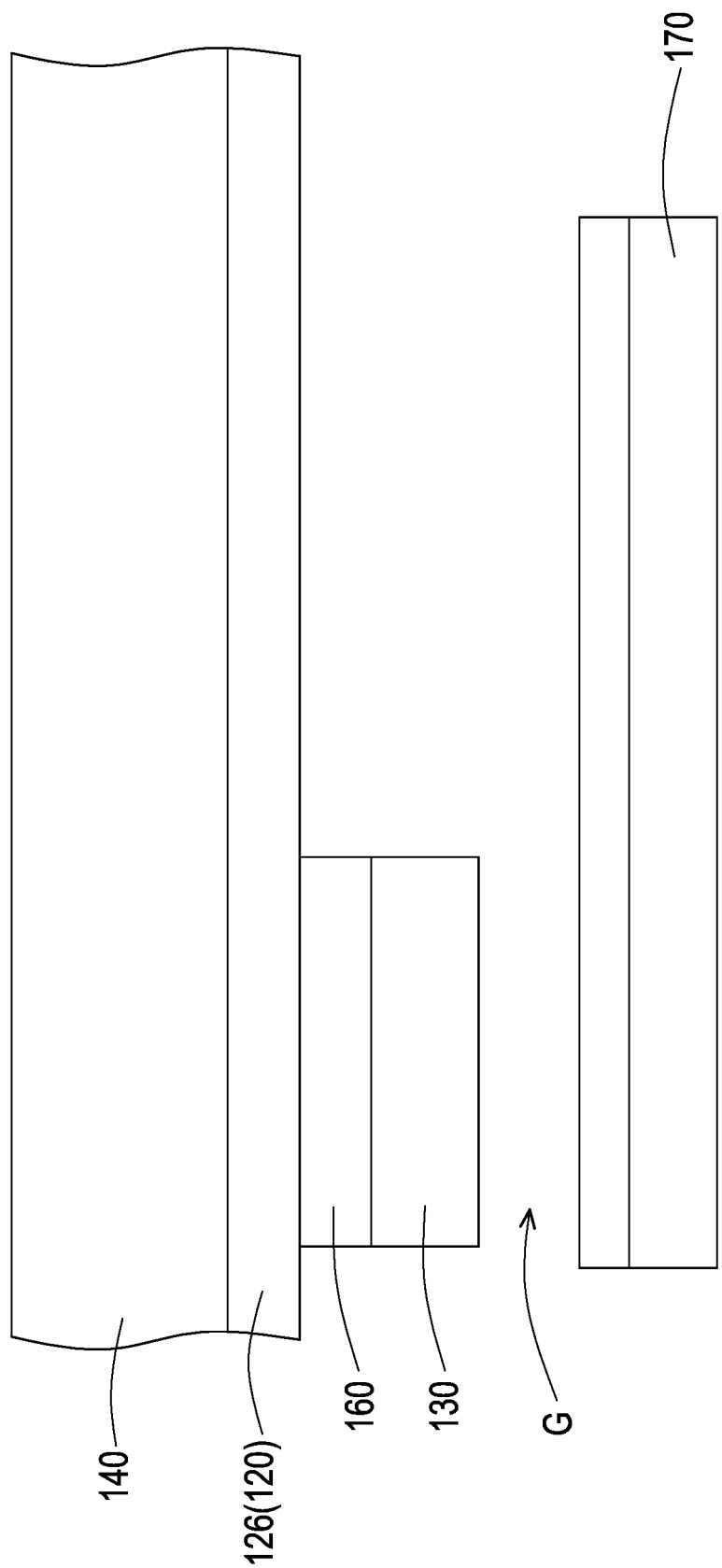
FIG. 4 is a schematic partial cross-sectional view of the dashboard device in FIG. 2.

FIG. 4 is a schematic partial cross-sectional view of the dashboard device in FIG. 2. Referring to FIGS. 3 and 4, the dashboard device 100 in this embodiment further includes a fingerprint identification assembly 130. The fingerprint identification assembly 130 is disposed on the device body 110 and configured to identify a fingerprint of the user. Accordingly, even if the user loses or forgets to carry a key (or a remote control), the mobile carrier 10 may still be operated and driven through a fingerprint identification function. In addition, through authentication of the user, the mobile carrier 10 may perform corresponding function setting and management for different users.

In addition, the fingerprint identification assembly 130 is, for example, an ultrasonic fingerprint identification assembly. Therefore, the fingerprint identification assembly 130 may be hidden in an appropriate position under the functional interface layer 120 of the dashboard device 100 to perform ultrasonic sensing on the fingerprint under a condition of being covered by the functional interface layer 120. Specifically, the fingerprint identification assembly 130 in this embodiment is located under the shield layer 126 of the functional interface layer 120 and covered by the shield layer 126, for example. Furthermore, if the functional interface layer 120 includes a touch area, the position of the fingerprint identification assembly 130 may avoid the touch area.

The shield layer 126 in this embodiment is formed by mixing oligomers, monomers, photoinitiators, solvents, etc., and has multiple air bubbles therein, for example. In view of a fact that ultrasonic waves may not be transmitted at a predetermined speed and/or direction due to changes in a transmission medium when passing through the air bubbles in the shield layer 126, a size of each of the air bubbles is, for example, less than 5 microns to prevent the air bubbles from excessively affecting transmission of the ultrasonic waves.

Referring to FIG. 4, the dashboard device 100 in this embodiment further includes a double-sided adhesive 160. The fingerprint identification assembly 130 is glued to the functional interface layer 120 through the double-sided adhesive 160. A thickness of the double-sided adhesive 160 is, for example, about 15 microns. In addition, the dashboard device in this embodiment further includes a cushion material 170. The cushion material 170 is, for example, foam or other types of cushion materials, which is disposed under the fingerprint identification assembly 130 such that the fingerprint identification assembly 130 is located between the functional interface layer 120 and the cushion material 170. When a finger of the user presses the functional interface layer 120 to move the fingerprint identification assembly 130 downward, the cushion material 170 plays a cushioning role to prevent the fingerprint identification assembly 130 from being damaged. Furthermore, there is, for example, a gap G between the fingerprint identification assembly 130 and the cushion material 170, and the gap G is greater than 0.15 mm, for example, so as to prevent a background value of the fingerprint identification assembly 130 from being too large and affecting the ultrasonic sensing thereof.

Referring to FIG. 3, the dashboard device 100 in this embodiment further includes a light-transmitting protection plate 140, which is, for example, a glass plate. The light-transmitting protection plate 140 is surrounded by the frame portion 112, and the light-transmitting protection plate 140 covers the functional interface layer 120. In order to provide good protection when applied to the mobile carrier, the light-transmitting protection plate 140 is required to have a sufficiently large thickness. On top of that, a light transmittance of the light-transmitting protection plate 140 is, for example, greater than 94% and contains a small amount of impurities. As a result, when the light-transmitting protection plate 140 has the large thickness, the fingerprint identification assembly 130 may successfully perform the ultrasonic sensing on the finger of the user above the light-transmitting protection plate 140. In addition, a driving voltage of the fingerprint identification assembly 130 is greater than 1000 mV, so that it has a good receiving amplitude and contrast ratio of a bounce signal, and that the ultrasonic sensing may be successfully performed when the light-transmitting protection plate 140 has the large thickness.

As mentioned above, in this embodiment, the fingerprint identification assembly 130 is disposed under the functional interface layer 120 of the dashboard device 100 with the high-thickness protection plate 140, and the shield layer 126 of the functional interface layer 120 is set to have the small-sized air bubbles and the driving voltage of the fingerprint identification assembly 130 is moderately increased, so that the fingerprint identification assembly 130 may normally perform fingerprint identification when the protection plate 140 has the high thickness. In light of the above, an overall combination of the protection plate 140, the functional interface layer 120, and the fingerprint identification assembly 130 in this embodiment and the above configuration make it possible to be successfully applied to the mobile carrier, which is different from a conventional electronic device in which an ultrasonic fingerprint sensor is disposed under a touch screen.

Figure 5:
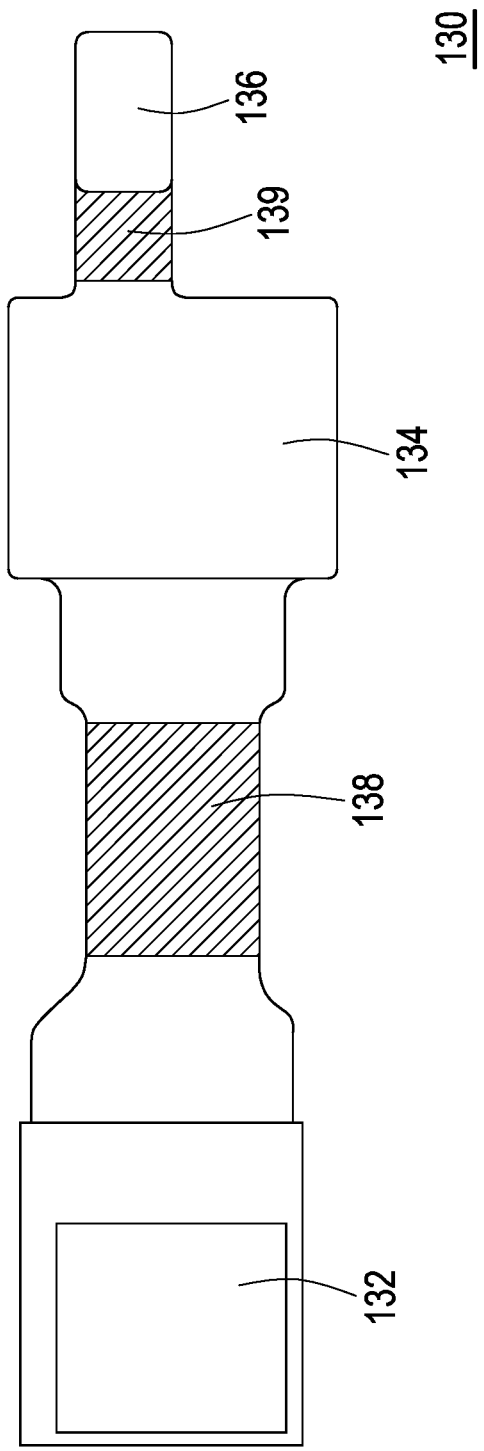
FIG. 5 is a top view of a fingerprint identification assembly in FIG. 3.

FIG. 5 is a top view of a fingerprint identification assembly in FIG. 3. FIG. 3 schematically shows the fingerprint identification assembly 130, and the fingerprint identification assembly 130 may actually include a fingerprint sensor 132, a controller 134, a connector 136, and two flexible printed circuits 138 and 139 as shown in FIG. 5. The flexible printed circuit 138 is connected between the fingerprint sensor 132 and the controller 134, and the flexible printed circuit 139 is connected between the connector 136 and the controller 134. The fingerprint sensor 132 is, for example, an ultrasonic sensor and is configured to perform the ultrasonic sensing on the fingerprint of the user. The controller 134 is, for example, a micro control unit (MCU) and is configured to calculate a sensing result of the fingerprint sensor 132. The connector 136 is configured to transmit a calculation result of the controller 134 to a motherboard of the dashboard device 100. The flexible printed circuits 138 and 139 enable the fingerprint identification assembly 130 to be properly bent according to surrounding structures thereof during installation due to flexible characteristics thereof, so as to improve installation convenience and versatility of the fingerprint identification assembly 130.

Figure 6:
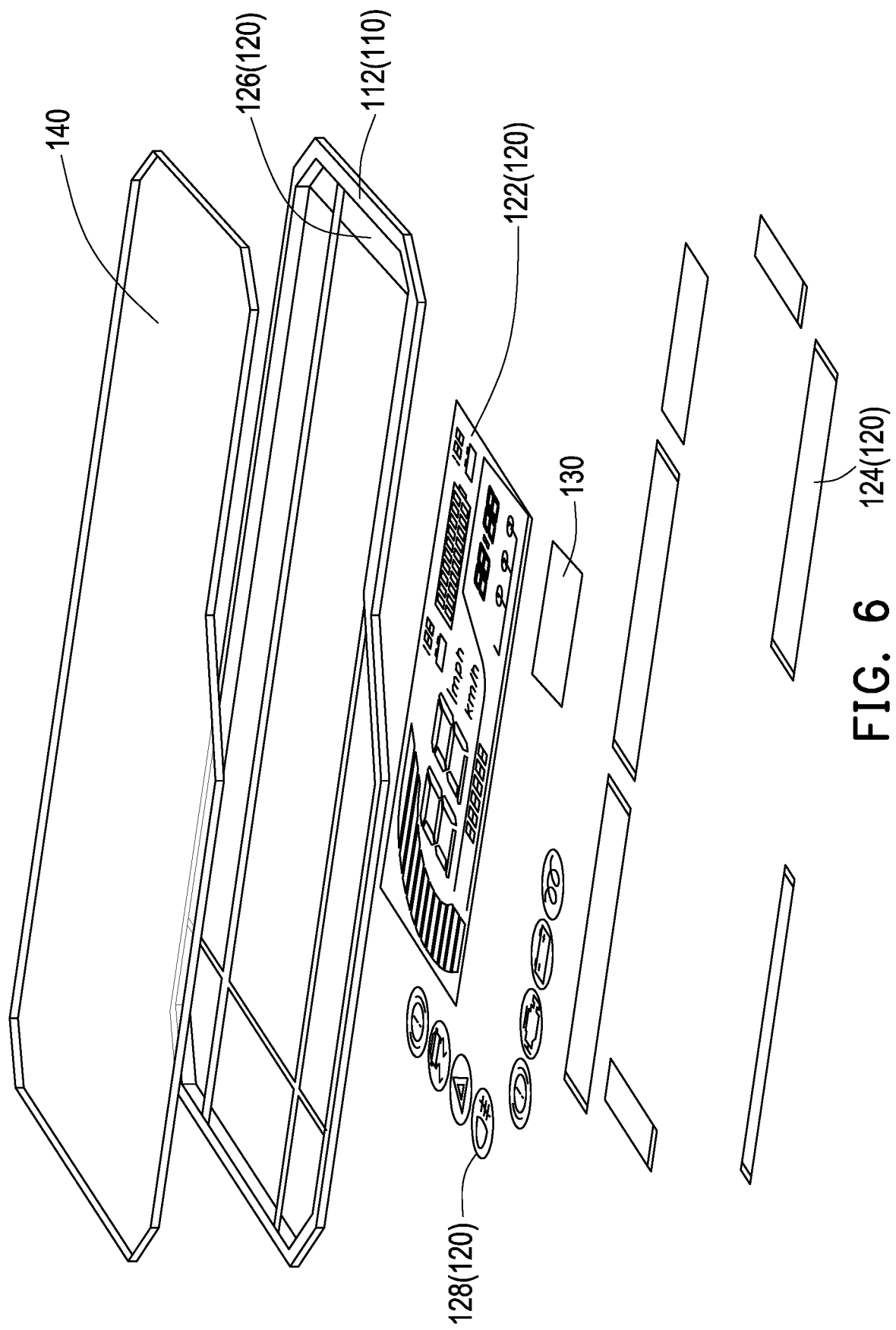
FIG. 6 is an exploded view of a dashboard device according to another embodiment of the disclosure.
Figure 7:
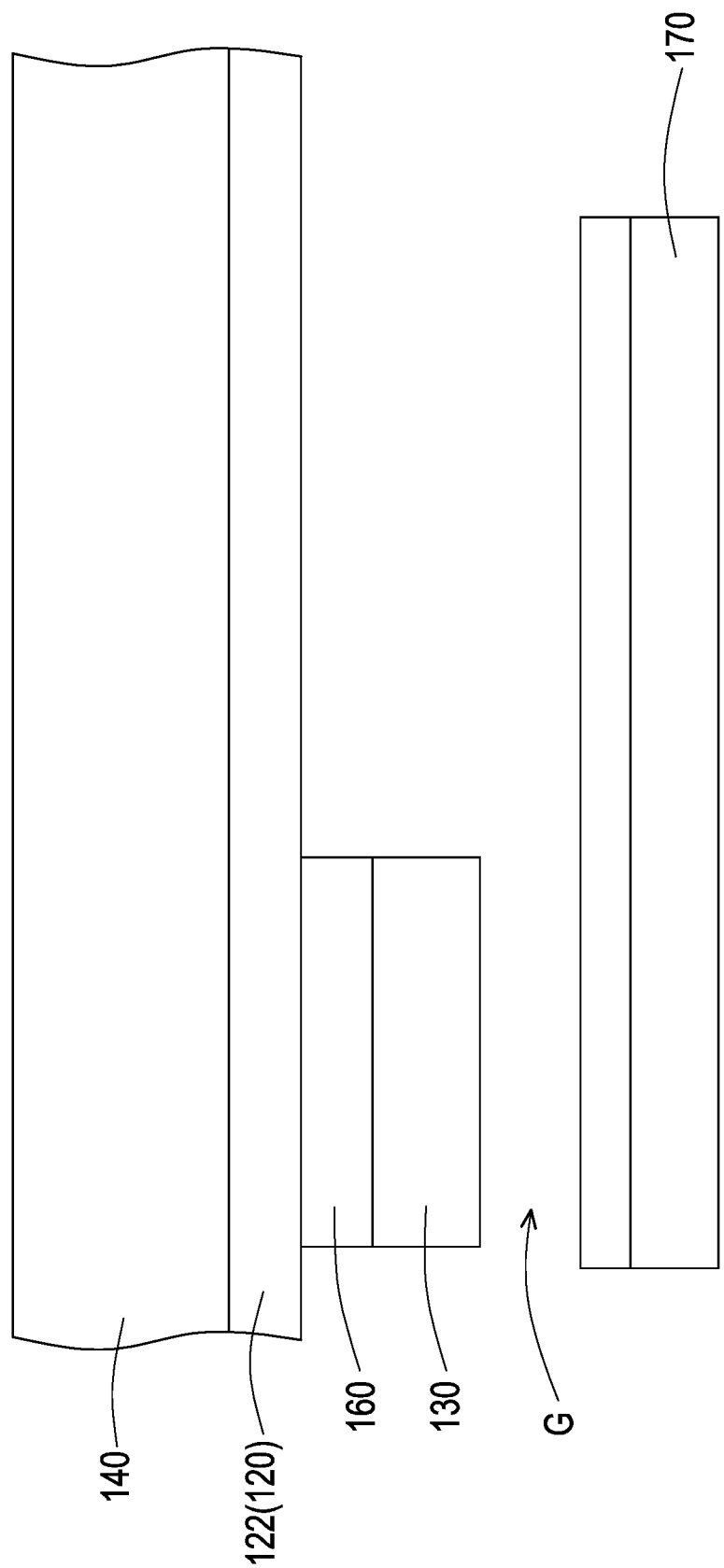
FIG. 7 is a schematic partial cross-sectional view of the dashboard device in FIG. 6.
Figure 8:
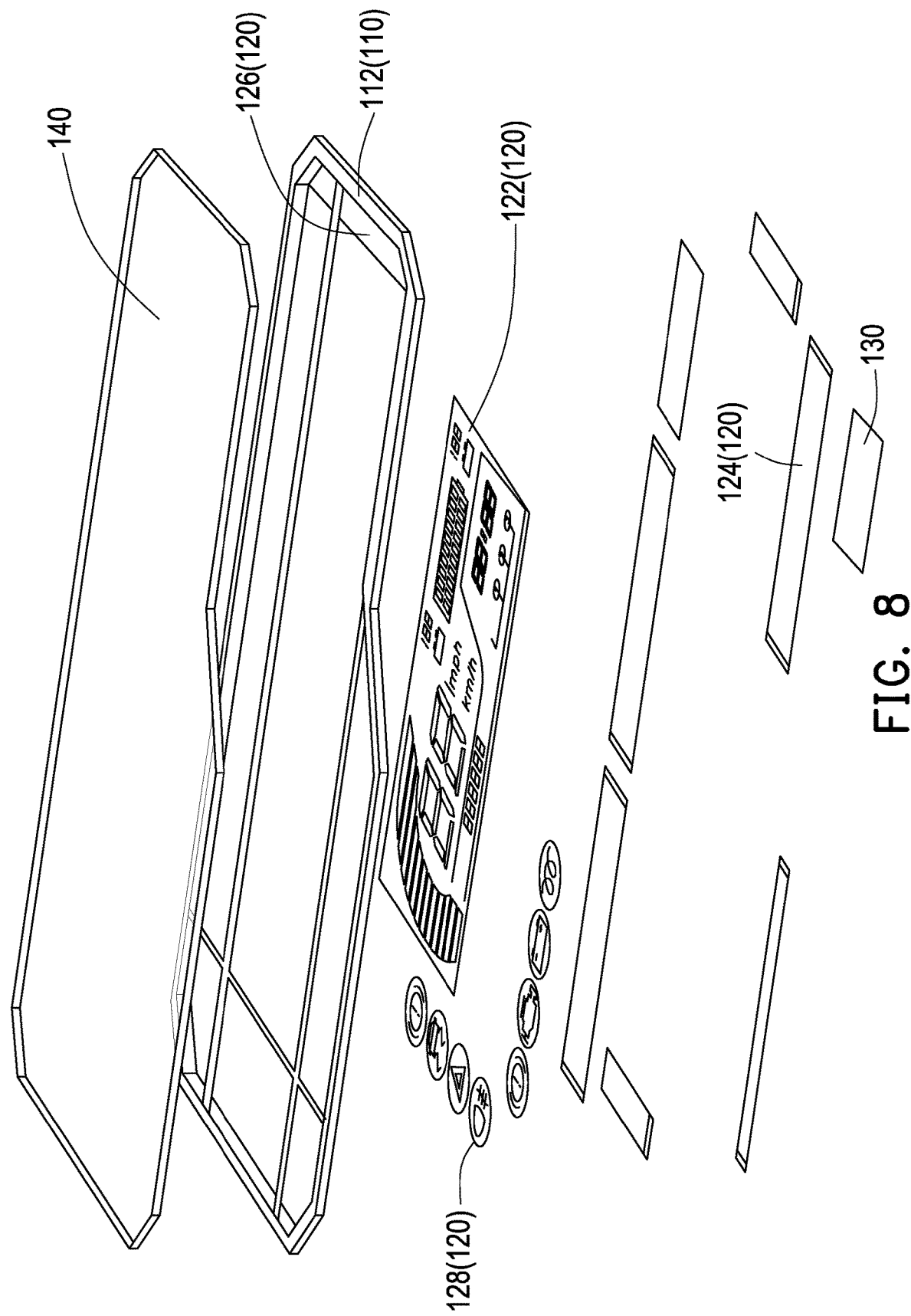
FIG. 8 is an exploded view of a dashboard device according to another embodiment of the disclosure.
Figure 9:
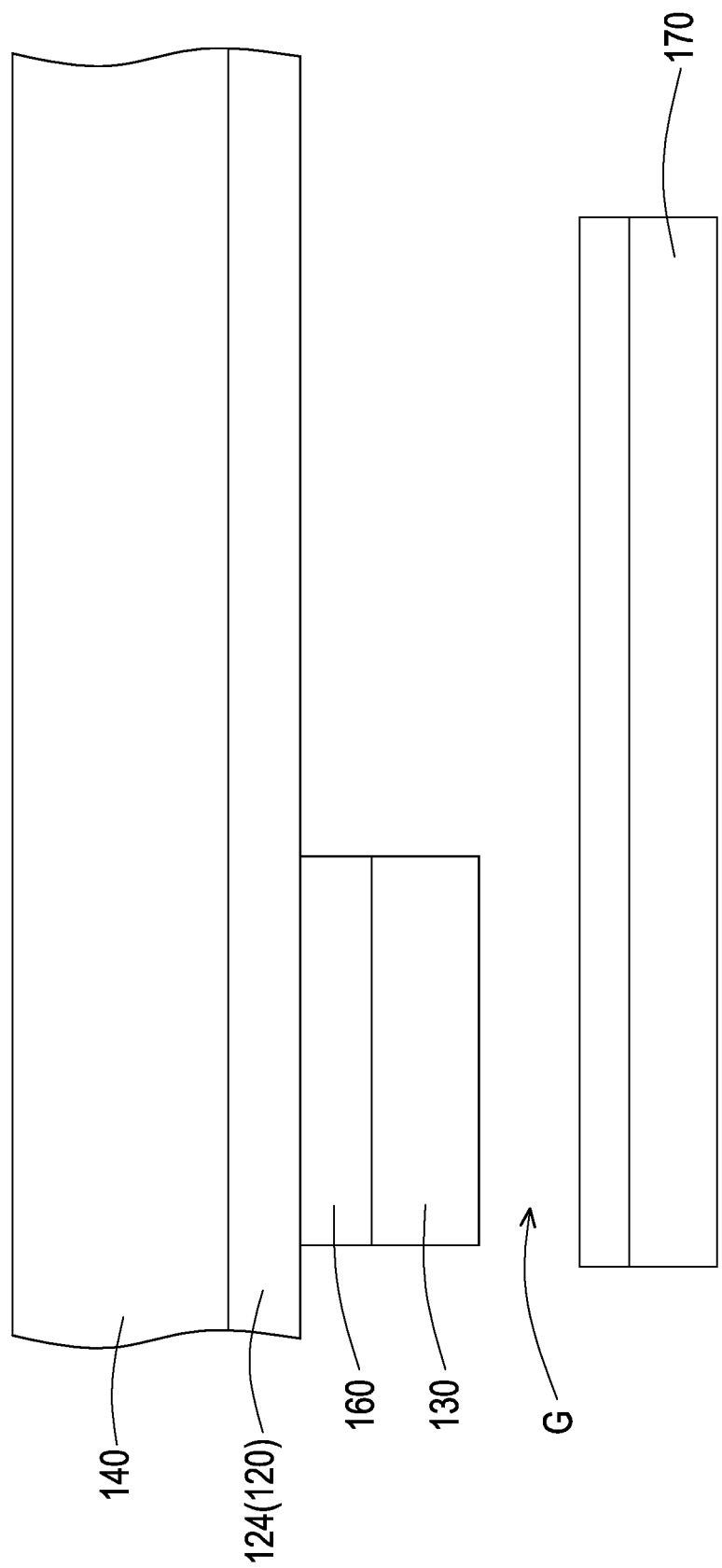
FIG. 9 is a schematic partial cross-sectional view of the dashboard device in FIG. 8.

The disclosure does not limit the position of configuration of the fingerprint identification assembly 130, and examples are as follows. FIG. 6 is an exploded view of a dashboard device according to another embodiment of the disclosure. FIG. 7 is a schematic partial cross-sectional view of the dashboard device in FIG. 6. A difference between the embodiments shown in FIGS. 6 and 7 and the embodiments shown in FIGS. 3 and 4 lies in the position of configuration of the fingerprint identification assembly 130. Specifically, in the embodiments shown in FIGS. 6 and 7, the fingerprint identification assembly 130 is disposed under the display panel 122 and covered by the display panel 122. FIG. 8 is an exploded view of a dashboard device according to another embodiment of the disclosure. FIG. 9 is a schematic partial cross-sectional view of the dashboard device in FIG. 8. A difference between the embodiments shown in FIGS. 8 and 9 and the embodiments shown in FIGS. 3 and 4 lies in the position of configuration of the fingerprint identification assembly 130. Specifically, in the embodiments shown in FIGS. 8 and 9, the fingerprint identification assembly 130 is disposed under the solar element 124 and covered by the solar element 124.

Figure 10:
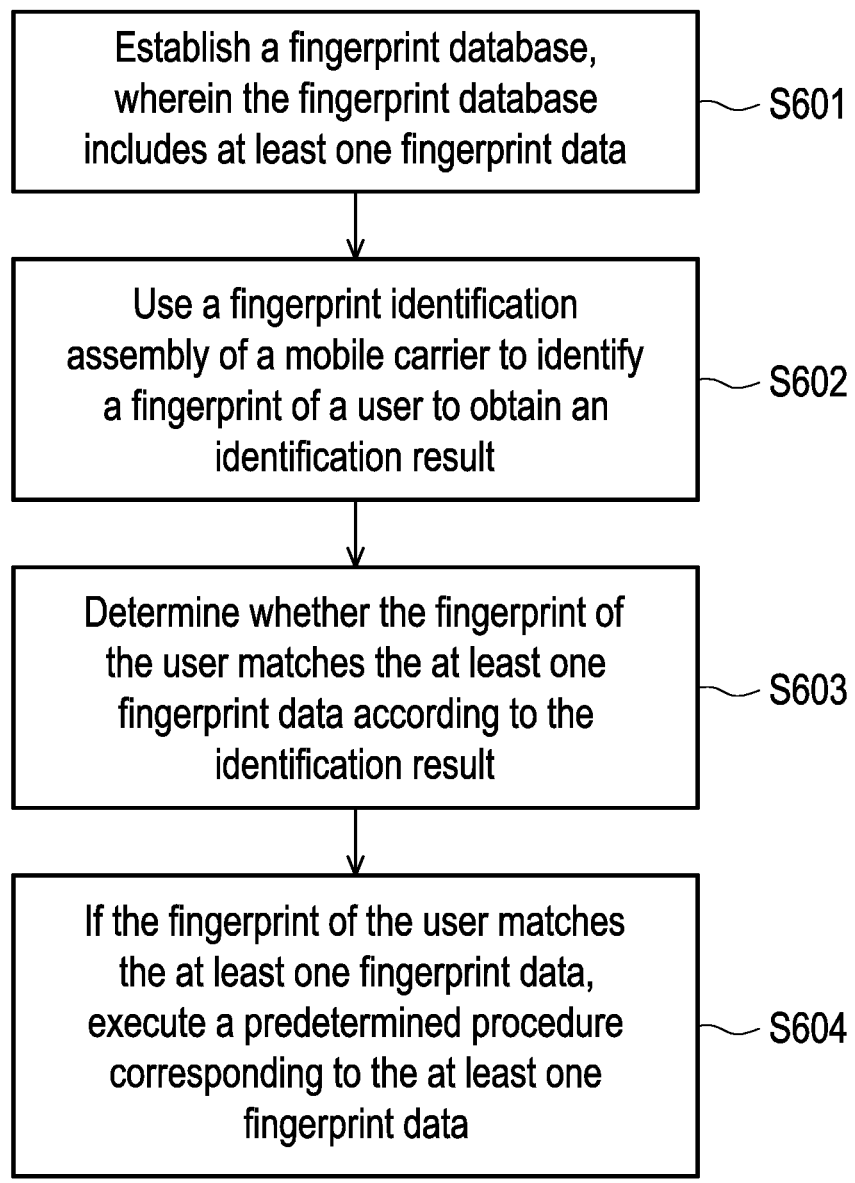
FIG. 10 is an authentication method for a mobile carrier according to an embodiment of the disclosure.

Hereinafter, an authentication method for the mobile carrier according to an embodiment of the disclosure is described. FIG. 10 is an authentication method for the mobile carrier according to an embodiment of the disclosure. Referring to FIG. 10, first, a fingerprint database is established, and the fingerprint database includes at least one fingerprint data (step S601). Use a fingerprint identification assembly (e.g., the fingerprint identification assembly 130 in the aforementioned embodiment) of a mobile carrier (e.g., the mobile carrier 100 in the aforementioned embodiment) to identify the fingerprint of the user to obtain an identification result (step S602). It is determined whether the fingerprint of the user matches the at least one fingerprint data according to the identification result (step S603). If the fingerprint of the user matches the at least one fingerprint data, a predetermined procedure corresponding to the at least one fingerprint data is performed (step S604).

The disclosure does not limit a device configured to store the fingerprint database in step S601, which may be various mobile devices or computer devices, and the mobile devices or the computer devices may upload the stored fingerprint database to a server or a cloud system. In addition, the disclosure does not limit a type of the predetermined procedure in step S604. For example, the predetermined procedure may be to start the mobile carrier 100, to open a fuel tank of the mobile carrier 100, or to open a seat cushion after the mobile carrier 100 is executed. The predetermined procedure may be setting of a speed limit for executing the mobile carrier 100 for different users. The predetermined procedure may be records of violations and driving patterns of executing the mobile carrier 100. The fingerprint database is, for example, stored in a management system of a freight fleet using the mobile carrier 100, and the predetermined procedure may be to execute login/logout of a personnel of the freight fleet. The fingerprint database is, for example, stored in a management system of a merchant, and the predetermined procedure may be to execute electronic payment to the merchant.

Based on the above, the dashboard device of the mobile carrier in the disclosure is provided with the fingerprint identification assembly for identifying the fingerprint of the user. Accordingly, even if the user loses or forgets to carry the key (or the remote control), the mobile carrier may still be operated and driven through the fingerprint identification function. Moreover, through the authentication of the user, the mobile carrier may perform the corresponding function setting and management for different users. In addition, the fingerprint identification assembly is the ultrasonic fingerprint identification assembly. Therefore, the fingerprint identification assembly may be hidden in the appropriate position under the functional interface layer of the dashboard device to perform the ultrasonic sensing on the fingerprint under the condition of being covered by the functional interface layer.

What is claimed is:

1. A dashboard device, comprising:
a device body;
a functional interface layer disposed on the device body; and
an ultrasonic fingerprint identification assembly disposed on the device body and covered by the functional interface layer,
wherein the functional interface layer comprises at least one solar element, and the at least one solar element covers the ultrasonic fingerprint identification assembly.

2. The dashboard device according to claim 1, wherein the functional interface layer comprises a display panel, and the display panel covers the ultrasonic fingerprint identification assembly.

3. The dashboard device according to claim 1, wherein the functional interface layer comprises a shield layer, and the shield layer covers the ultrasonic fingerprint identification assembly.

4. The dashboard device according to claim 3, wherein the shield layer has a plurality of air bubbles, and each of the air bubbles has a size of less than 5 microns.

5. The dashboard device according to claim 1, comprising a double-sided adhesive, wherein the ultrasonic fingerprint identification assembly is glued to the functional interface layer through the double-sided adhesive.

6. The dashboard device according to claim 1, comprising a cushion material, wherein the ultrasonic fingerprint identification assembly is located between the functional interface layer and the cushion material, and a gap is between the ultrasonic fingerprint identification assembly and the cushion material.

7. The dashboard device according to claim 6, wherein the gap is greater than 0.15 mm.

8. The dashboard device according to claim 1, comprising a light-transmitting protection plate, wherein the light-transmitting protection plate covers the functional interface layer.

9. The dashboard device according to claim 8, wherein a light transmittance of the light-transmitting protection plate is greater than 94%.

10. The dashboard device according to claim 1, wherein a driving voltage of the ultrasonic fingerprint identification assembly is greater than 1000 millivolts.

11. The dashboard device according to claim 1, wherein the ultrasonic fingerprint identification assembly comprises a fingerprint sensor, a controller, a connector, and two flexible printed circuits, one of the two flexible printed circuits is connected between the fingerprint sensor and the controller, and the other of the two flexible printed circuits is connected between the connector and the controller.

12. A mobile carrier, comprising:
    a carrier body; and
    a dashboard device comprising:
        a device body disposed on the carrier body;
        a functional interface layer disposed on the device body; and
        an ultrasonic fingerprint identification assembly disposed on the device body and covered by the functional interface layer,
    wherein the functional interface layer comprises at least one solar element, and the at least one solar element covers the ultrasonic fingerprint identification assembly.

13. The mobile carrier according to claim 12, wherein the functional interface layer comprises a display panel, and the display panel covers the ultrasonic fingerprint identification assembly.

14. The mobile carrier according to claim 12, wherein the functional interface layer comprises a shield layer, the shield layer covers the ultrasonic fingerprint identification assembly, the shield layer has a plurality of air bubbles, and each of the air bubbles has a size of less than 5 microns.

15. The mobile carrier according to claim 12, wherein the dashboard device comprises a cushion material, the ultrasonic fingerprint identification assembly is located between the functional interface layer and the cushion material, a gap is between the ultrasonic fingerprint identification assembly and the cushion material, and the gap is greater than 0.15 mm.

16. The mobile carrier according to claim 12, wherein the dashboard device comprises a light-transmitting protection plate, the light-transmitting protection plate covers the functional interface layer, and a light transmittance of the light-transmitting protection plate is greater than 94%.

17. The mobile carrier according to claim 12, wherein a driving voltage of the ultrasonic fingerprint identification assembly is greater than 1000 millivolts.

18. An authentication method for a mobile carrier, comprising:
    establishing a fingerprint database, wherein the fingerprint database comprises at least one fingerprint data;
    using the ultrasonic fingerprint identification assembly of the mobile carrier according to claim 12 to identify a fingerprint of a user to obtain an identification result;
    determining whether the fingerprint of the user matches the at least one fingerprint data according to the identification result; and
    if the fingerprint of the user matches the at least one fingerprint data, executing a predetermined procedure corresponding to the at least one fingerprint data.

* * * * *